(12) United States Patent
Venkatasubramanian et al.

(10) Patent No.: US 12,445,054 B2
(45) Date of Patent: Oct. 14, 2025

(54) PMU TECHNIQUE FOR ULTRA-LOW LEAKAGE

(71) Applicant: Cypress Semiconductor Corporation, San Jose, CA (US)

(72) Inventors: Radhika Venkatasubramanian, Austin, TX (US); Stephen Dow, Austin, TX (US)

(73) Assignee: Cypress Semiconductor Corporation, San Jose, CA (US)

( * ) Notice: Subject to any disclaimer, the term of this patent is extended or adjusted under 35 U.S.C. 154(b) by 284 days.

(21) Appl. No.: 18/352,786

(22) Filed: Jul. 14, 2023

(65) Prior Publication Data

US 2025/0023469 A1    Jan. 16, 2025

(51) Int. Cl.
*H02M 3/158* (2006.01)
*H02M 1/00* (2006.01)
*H02M 3/157* (2006.01)

(52) U.S. Cl.
CPC ......... *H02M 3/158* (2013.01); *H02M 1/0035* (2021.05); *H02M 3/157* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225;
(Continued)

(56) References Cited

U.S. PATENT DOCUMENTS

7,714,551 B2 * 5/2010 Fan ................... G05F 1/565
                                              323/273
10,003,265 B2 * 6/2018 Murakami .......... H02M 3/1588
(Continued)

*Primary Examiner* — Jeffrey A Gblende (57) ABSTRACT

A DC-DC converter and method of operating the same are provided to increase efficiency in window-mode. Generally, the method begins in a coasting-period with receiving in the converter a window-mode enable signal, and opening a switch through which a low reference voltage generator is coupled to a capacitively-charged switched reference (SR) on a first input of a low-side-comparator. Operation of all circuits and devices in the converter, except the comparator is suspended. The voltage on the SR is compared to a feedback voltage (vfb) coupled to a second input of the comparator from a regulated rail coupled to an output of the converter, to sense a change in the voltage on the regulated rail as it is discharged through a load coupled thereto. When vfb is less than the SR voltage, in a burst-period operation of circuits and devices is resumed, and the switch is closed to recharge the SR.

22 Claims, 5 Drawing Sheets

(58) Field of Classification Search
CPC .. H02M 7/217; H02M 1/0025; H02M 1/0045; H02M 1/0009; H02M 1/08; H02M 1/088; H02M 1/0048; H05B 39/048; B23K 11/24; H04B 2215/069
See application file for complete search history.

(56) References Cited

U.S. PATENT DOCUMENTS

| | | | |
|---|---|---|---|
| 11,452,184 B1 * | 9/2022 | Adragna | H02M 1/4225 |
| 11,622,429 B1 * | 4/2023 | Adragna | H05B 45/375 |
| | | | 315/186 |

* cited by examiner

PMU TECHNIQUE FOR ULTRA-LOW LEAKAGE

TECHNICAL FIELD

This disclosure relates generally to power management units, and more particularly to those including DC-DC converter and methods of operating the same to reduce static leakage current.

BACKGROUND

The development of miniaturized portable electronic devices including wireless internet of things (IoT) applications, implantable medical devices and wearable devices, such as smart watches, smart glasses and activity trackers, that use batteries or other DC power sources with limited stored energy has led to challenges to extend a time between recharge and/or replacement cycles of power sources for these devices.

One approach to extending the recharge and/or replacement cycle of these device has been the introduction of a standby or sleep' or 'deep-sleep' in which a computer or controller in these devices cuts power to unneeded subsystems, including sensors and transceivers, and places the device into a minimum power state.

Although affording significant improvements in extending the time between recharge and replacement, this approach has not been wholly satisfactory for a number of reasons. While these-modes are the opposite of 'active'-modes and typically see a lack of significant activity a number subsystems are still 'alive' and drawing current from an internal voltage rail to provide power for various internal functions. Chief among these is a DC-DC converter inside a power management unit (PMU) of the device, typically used to regulate the voltage rail. Even in 'sleep' or 'deep-sleep'-modes, these internal functions consume very low currents. However, the regulated voltage rails need to maintain pre-defined accuracy levels in all modes of operation including 'active', 'sleep' and 'deep-sleep'-modes to power a wake-up circuit and associated sensors. Thus, conventional DC-DC converters typically include voltage regulators including some combination of "Always-ON" (AON) references, comparators, amplifiers, buffers and drivers in order to regulate these internal or external rails, and, as a result, draw continuous or "DC" or static leakage current from the battery or other DC power source.

Accordingly, there is a need for PMUs and power management methods to extend the recharge and/or replacement cycle for these portable devices. It is further desirable that the PMU and management are compatible with designs for PMU and operating methods for existing portable devices.

SUMMARY

A DC-DC converter for use in a power management unit (PMU) and method for operating the same to reduce static quiescent current in the DC-DC converter while the PMU is in a window-mode is provided. The method begins with storing a low reference voltage (Vref_low) from a Vref_low generator to a local, capacitively-charged switched reference (SR) coupled to an input of a low-side-comparator. During a 'coasting-period' of the window mode a first switch is opened, isolating the SR from the Vref_low generator, and operation of all circuits and devices in the DC-DC converter-including the Vref_low generator, except the low-side-comparator are suspended. The low-side-comparator continues to operate, comparing the stored Vref_low on the SR to a feedback voltage (Vfb) coupled to a second input of from a reference voltage (Vref) on a regulated rail coupled to an output of the DC-DC converter, sensing from the comparison of SR to the Vfb a change in the Vref on the regulated rail as the regulated rail is discharged through a load coupled thereto. When Vref has decreased to the Vref_low stored on the SR, a low voltage signal ($V_L$) is output from the low-side-comparator to a window logic circuit. A burst enable (en_burst) signal generated in the window logic circuit is coupled to at least some of the circuits and devices in the DC-DC converter (including the Vref_low generator), signaling these circuits and devices to resume operation and the first switch to close recharging the SR to Vref_low. During the burst-period an inductor and output capacitor through which the regulated rail is coupled to the output of the DC-DC converter are charged to raise the Vref on the regulated rail from Vref_low to a high reference voltage (Vref_high). Generally, raising the Vref on the regulated rail includes generating a duty cycle (duty_cycle) signal in the window logic circuit, coupling the en_burst signal and duty_cycle signal to a driver logic circuit, and operating to the driver logic circuit to alternately drive a first transistor through which the output of the DC-DC converter is coupled to a positive voltage (VDD) and a second transistor through which the output is coupled to a negative voltage (VSS) to charge the inductor and output capacitor to raise the Vref from Vref_low to Vref_high.

The DC-DC converter further includes a high-side-comparator having a first input coupled to receive Vfb from the regulated rail, a second input coupled to a Vref_high generator, and an output coupled to the window logic circuit. In the burst-period the high-side-comparator is used to compare Vfb to Vref_high, and when Vfb is equal to or greater than Vref_high the high-side-comparator outputs a high voltage signal (VH) to the window logic circuit to terminate the en_burst signal, suspending operation of all circuits and devices in the DC-DC converter, except the low-side-comparator, and opening the first switch to isolate the SR from the Vref_low generator, returning the DC-DC generator to a coasting-period in the window mode.

The method may be extended to a capacitively-charged switched reference from a master reference generator. The master reference generator's operation is suspended in the coasting period, improving the PMU system efficiency in window-mode. In one embodiment the PMU further includes a master reference generator coupled through a second switch (S0) to a local, capacitively-charged band-gap reference (BG) in PMU, which is coupled to the Vref_low generator in the DC-DC converter. Both the master reference generator and the second switch (S0) are operable to receive a window-mode enable (en_window) signal, and a burst enable (en_burst) signal In active mode the master reference generator is operating and the second switch (S0) is closed storing a master reference voltage (Vref_bg) on the BG. During a coasting-period in a window mode, the operation of the master reference generator is suspended and the second switch (S0) is opened. During a burst-period, operation of the master reference generator is resumed and the second switch (S0) is closed storing Vref_bg on the BG, which is then coupled to the Vref_low generator in the DC-DC converter.

It will be understood that providing a local, capacitively-charged switched reference (SR) to the low-side-comparator, and suspending operation of all other circuits and devices in the DC-DC converter during a coasting-period in window-mode provides an efficient operation in operation in window-mode. It will be further understood that the efficiency of a PMU including such a DC-DC converter can be further increased in window-mode by suspending operation of a master reference generator coupled to the DC-DC converter, and by isolating a capacitively-charged band-gap reference (BG) in PMU, through which the master reference generator is coupled to the DC-DC converter from the master reference generator.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

DETAILED DESCRIPTION

A power management unit (PMU) and/or a DC-DC converter to increase efficiency in sleep or window-mode are provided. Briefly, the DC-DC converter includes a capacitively-charged switched reference (SR) coupled to a low-side-comparator and is operable during a coasting-period of a window-mode to isolate the SR from a low voltage reference (Vref_low) generator, and to suspend operation of all circuits and devices therein, except the low-side-comparator. By providing the local, SR to the comparator and suspending operation of all circuits and devices except the low-side-comparator, the duration or length of time of the coasting-periods in window-mode are extended relative to burst-periods, reduces current/power consumption of the DC-DC converter during window-mode.

In the following description, for purposes of explanation, numerous specific details are set forth in order to provide a thorough understanding of the present invention. It will be evident, however, to one skilled in the art that the present invention may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. The term to couple as used herein may include both to directly electrically connect two or more components or elements and to indirectly connect through one or more intervening components.

Figure 1:
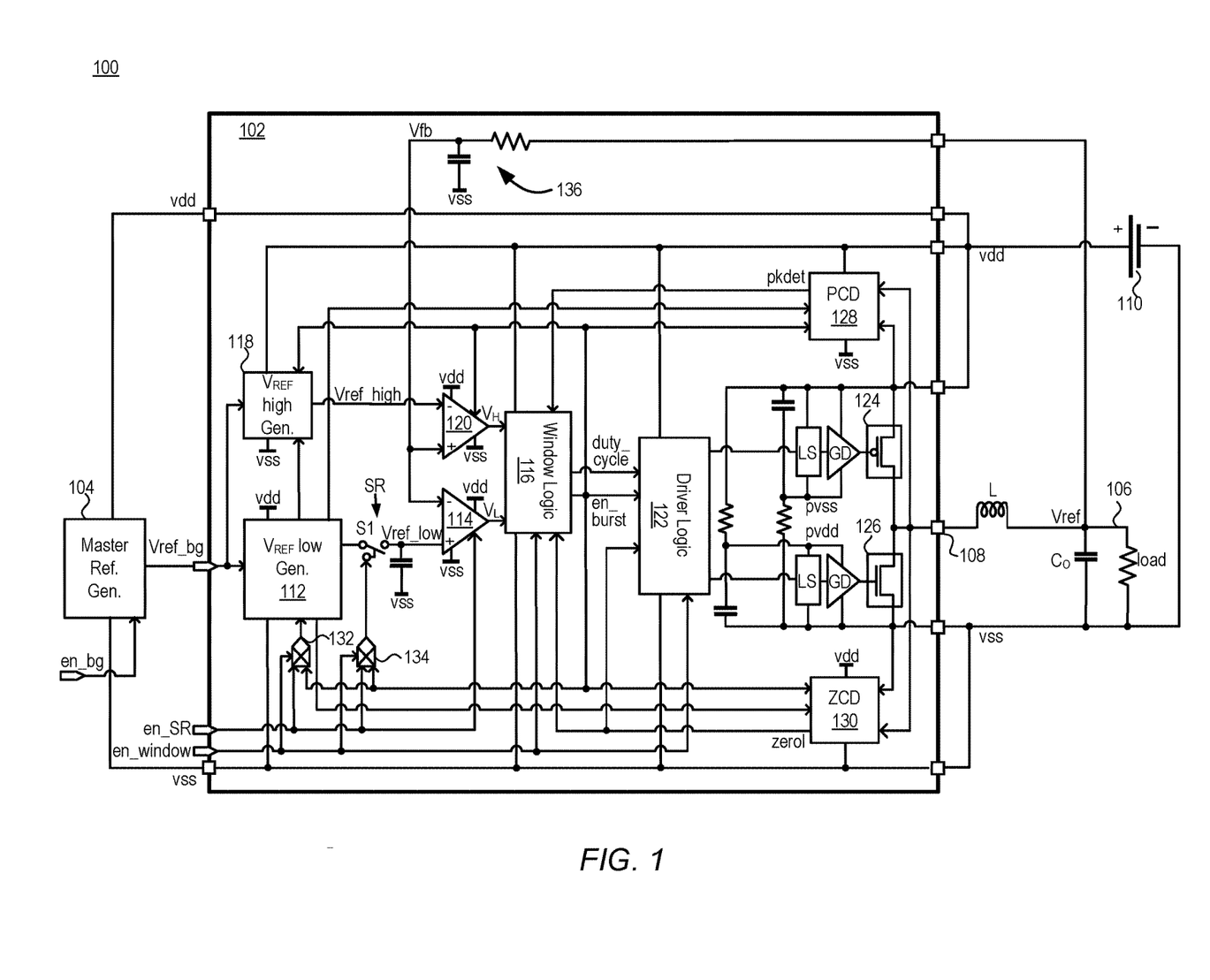
FIG. 1 is a schematic block diagram illustrating a portion of a power management unit (PMU) including a master reference generator and a DC-DC converter exhibiting low leakage current in sleep-modes according to an embodiment of the present disclosure.

FIG. 1 is a schematic block diagram illustrating a portion of a power management unit (PMU 100) including a DC-DC converter 102, a master reference generator 104, and a regulated rail 106 coupled to an output 108 of the DC-DC converter through an inductor (L). An output capacitor (CO) coupled in parallel with a load between the regulated rail 106 and a negative terminal of a battery or power source 110 provides a reference voltage (Vref) on the regulated rail, both when the PMU is in an active-mode and in a sleep-mode.

Referring to FIG. 1 the master reference generator 104 can include, for example, a band-gap reference generator and is configured or operable to receive a bandgap enable signal (en_bg) and to provide various voltage and current references to the DC-DC converter 102. These references can include a positive quiescent drain voltage (vdd), a negative quiescent source voltage (vss) and a master reference voltage (Vref_bg).

The DC-DC converter 102 generally includes a low reference voltage (Vref_low) generator 112 coupled through a low-side-comparator 114 to a window logic circuit 116; a high reference voltage (Vref_high) generator 118 coupled through a high-side-comparator 120 to the window logic circuit; and a driver logic circuit 122 coupled to the window logic circuit and configured or operable to drive circuit to alternately drive a PMOS first transistor 124 through which the output 108 of the DC-DC converter is coupled to a positive voltage (vdd) and an NMOS second transistor 126 through which the output 108 is coupled to a negative voltage (vss) to charge the inductor L and output capacitor CO to provide Vref to the load. Generally, the DC-DC converter 102 further includes a peak current detector (PCD 128) coupled to the output 108 and to the window logic circuit 116, the PCD operable to detect a peak current through the inductor L and transmit a pkdet signal to the window logic circuit, and a zero current detector (ZCD 130) coupled to the output and to the window logic circuit, the ZCD operable to detect a minimum or zero current through the inductor L and transmit a zero1 signal to the window logic circuit.

When the PMU 100 is operating in active-mode the all circuits and device in the DC-DC converter 102 are powered and operating normally to receive the master reference voltage (Vref_bg) and provide reference the voltage (Vref) on the regulated rail 106 coupled to the output 108 of the DC-DC converter.

The Vref_low generator 112 is coupled to the master reference generator 104 and is operable to receive Vref_bg therefrom, and to generate a number of voltage and current references for use in the DC-DC converter 102, including a low reference voltage (Vref_low) coupled through a switch S1 to a capacitively-charged switched reference (SR) connected to a first, non-inverting input of the low-side-comparator 114. Operation of the Vref_low generator 112 is controlled through a first demultiplexer or combinational logic element 132 by an enable SR signal (en_SR) and an enable window mode signal (en_window) from the PMU 100. Switch S1 is controlled through a second combinational logic element 134 by the en_SR and the en_window signals from the PMU 100, and is normally closed during the active-mode to allow Vref_low to be stored on the SR.

The window logic circuit 116 generates and couples a duty cycle signal (duty_cycle) to the driver logic circuit 122. The driver logic circuit 122 is coupled to each of the first and second transistors 124, 126, through a level shifter (LS) and a buffer or gate drive (GD), and is operable to alternately drive the first and second transistors. The PCD 128 provides a pkdet signal to the window logic circuit 116 when a peak inductor current is sensed, and the ZCD 130 provides a zero1 signal to the window logic circuit when a zero inductor current is sensed, causing the window logic circuit to provide a duty_cycle to the driver logic circuit 122 to provide and an active-mode reference voltage Vref on the output 108 on the output capacitor CO that fluctuates slightly, in synch with the inductor current.

When the PMU 100 enters sleep-mode, either following a predetermined period of inactivity in an electronic device including the PMU or in response to a user command, the window-mode enable signal (en_window) is generated and coupled to the DC-DC converter 102 placing it in a window-mode. When the DC-DC converter 102 initially enters window-mode it operated in a coasting-period in which operation of all circuits and devices in the DC-DC converter, except the low-side-comparator 114, are suspended. In particular, the first combinational logic element 132 receives the en_SR and the en_window signals and suspends operation of the Vref_low generator 112, and the second combinational logic element 134 receiving the same signals operates switch S1 to decouple the SR from the Vref_low generator 112.

During the coasting-period the low-side-comparator 114 continues to operate, sensing a change in Vref as the regulated rail 106 is discharged through the load by comparing the Vref_low stored on the SR to a feedback voltage (Vfb) proportional to Vref. and coupled from the regulated rail through a resistor-capacitor (RC) network or filter 136. When Vfb is less than or equal to Vref_low the low-side-comparator 114 outputs a low voltage signal (VL) to the window logic circuit 116.

In response to VL, the window logic circuit 116 generates and couples a burst enable signal (en_burst) to substantially all circuits and devices in the DC-DC converter 102, causing the DC-DC converter 102 to enter a burst-period. During the burst-period circuits and device in the DC-DC converter 102, including the Vref_low generator 112, the window logic circuit 116, the Vref_high generator 118, the high-side-comparator 120, the driver logic circuit 122, the PCD 128 and the ZCD 130, resume operation and begin charging the inductor L and output capacitor CO, raising the Vref on the regulated rail 106 from a low voltage substantially equal to Vref_low to a high reference voltage (Vref_high).

Additionally, the en_burst signal is coupled to the first combinational logic element 132 causing it to control the Vref_low generator 112 to resume operation, and to the second combinational logic element 134 causing it to operates switch S1 to couple the SR to the Vref_low generator 112 to recharge the Vref_low stored on the SR During the burst-period the high-side-comparator 120 operates to sense the rising Vref on the regulated rail 106 by comparing the Vref_high coupled from the Vref_high generator 118 to the feedback voltage (Vfb) coupled from the regulated rail through the RC filter 136. When Vfb is equal to Vref_high the high-side-comparator 120 outputs a high voltage signal (VH) to the window logic circuit 116, causing it to terminate the en_burst signal, and the DC-DC converter 102 to resume or re-enter a coasting-period in which operation of all circuits and devices, except the low-side-comparator, are suspended, and switch S1 is opened decoupling the SR from the Vref_low generator 112.

Figure 2:
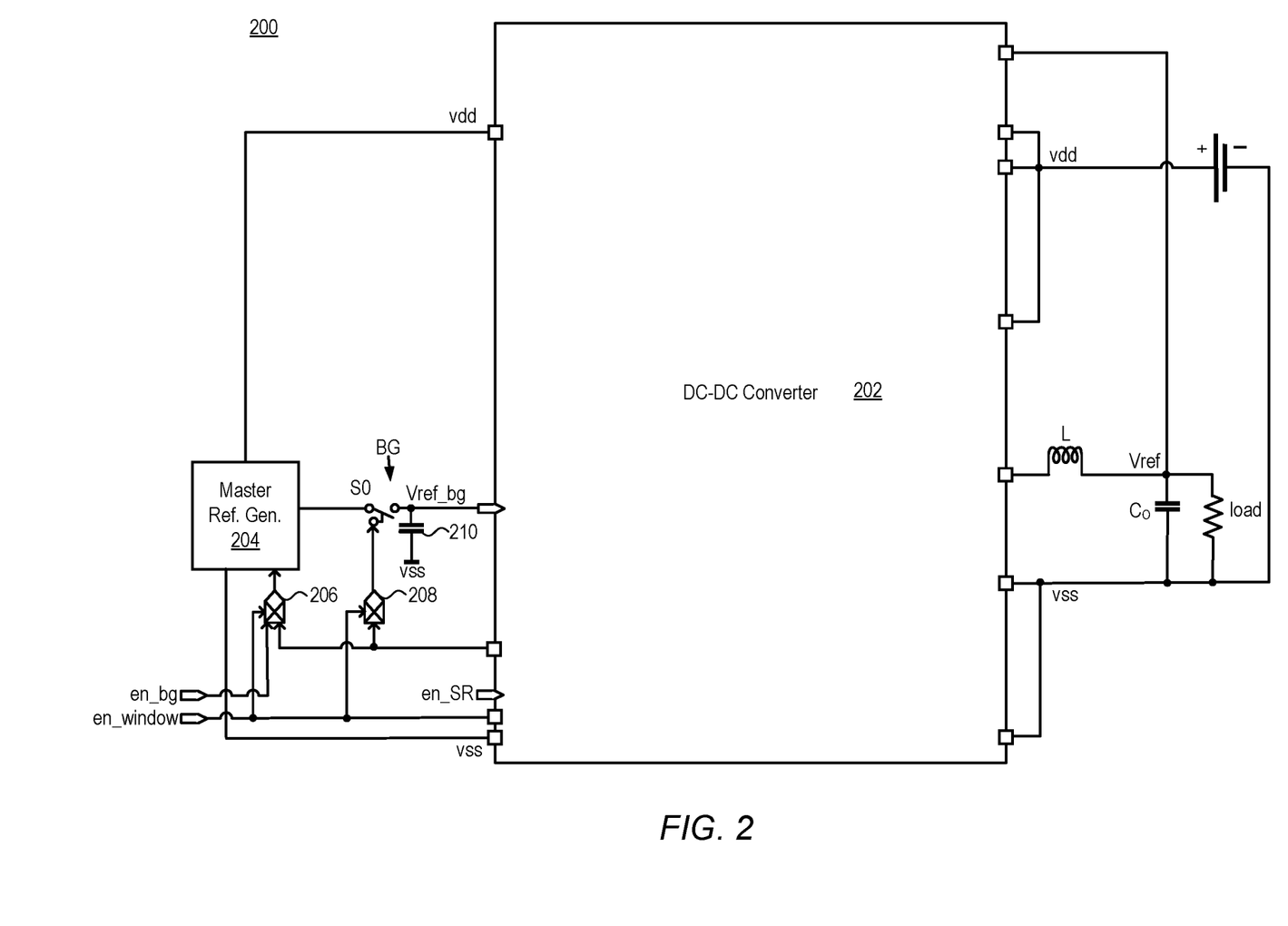
FIG. 2 is a schematic block diagram illustrating a portion of a PMU including a bandgap reference generator and a DC-DC converter according to an embodiment of the present disclosure.

FIG. 2 is a schematic block diagram illustrating another embodiment of a portion of a PMU 200 including a bandgap or master reference generator that can be isolated from the DC-DC converter and for which operation can be suspended during a sleep-mode. Referring to FIG. 2 the PMU 200 includes, in addition to a DC-DC converter 202 substantially the same as that described above with respect to FIG. 1, a band-gap or master reference generator 204 for which operation can be suspended in window-mode, and which can be isolated from the DC-DC converter by a switch S0. Operation of the master reference generator 204 is controlled by the PMU 200 and DC-DC converter 202 through a third combinational logic element 206, and switch S0 is controlled by the PMU and DC-DC converter through a forth combinational logic element 208.

In active-mode the third combinational logic element 206 receives a high a bandgap enable signal (en_bg) and a low window-mode enable signal (en_window) from the PMU 200, and a low enable burst signal (en_burst) from the DC-DC converter 202, and the master reference generator 204 is operated to provide various voltage and current references to the DC-DC converter. These references can include a positive or drain reference voltage (vdd), a negative or source reference voltage (vss) and a master reference voltage (Vref_bg) coupled through switch S0 to a Vref_bg capacitor 210 form a capacitively-charged band-gap reference (BG) coupled to a Vref_low generator (not shown in this figure) in the DC-DC converter 202 to the DC-DC converter 202. Switch S0 is normally closed during active-mode and during a burst-period in window mode to charge the Vref_bg capacitor 210 to Vref_bg.

When the PMU 200 enters a sleep-mode a high en_window (window-mode enable signal) from the PMU to the third combinational logic element 206 causes operation of the master reference generator 204 to be suspended, and the fourth combinational logic element 208 to operate switch S0 to open, isolating the master reference generator 204 from the DC-DC converter 202. At substantially the same time, the DC-converter 202 enters a window-mode in response to the high en_window, and when, following a coasting-period, the regulated rail has discharged through a load so that a feedback voltage (Vfb) from the regulated rail is less than or equal to a low reference voltage (Vref_low), the DC-DC converter 202 enters a burst-period and a high en_burst (enable burst signal) is generated by the window logic circuit (not shown in this figure) and coupled to the third and fourth combinational logic elements 206, 210. The high en_burst causes the third combinational logic element 206 to resume operation of the master reference generator 204, and the fourth combinational logic element 210 to close switch S0 coupling Vref_bg to the DC-DC converter 202.

Figure 3:
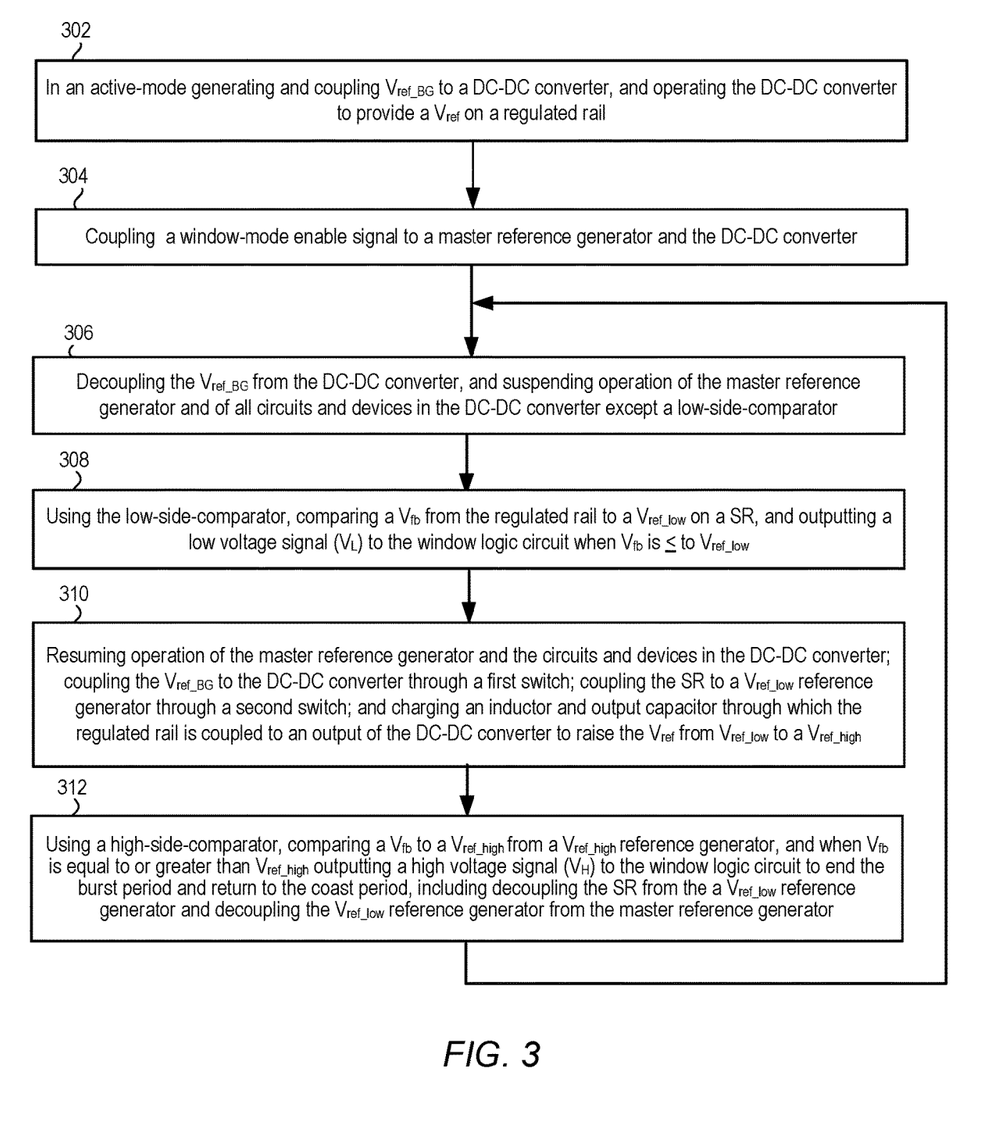
FIG. 3 is a flowchart illustrating a method for operating the PMU and DC-DC converter of FIGS. 1 and/or 2.

A method for operating a PMU including a switched master reference generator and a DC-DC converter having a capacitively-charged switched reference (SR) will now be described with reference to FIGS. 3 and 4, where FIG. 3 is a flowchart illustrating a method for operating the PMU and DC-DC converter of FIGS. 1 and 2, and FIG. 4 includes timing diagrams for signals in the DC-DC converter, and graphs illustrating various current and voltage generated in the DC-DC converter.

Figure 4:
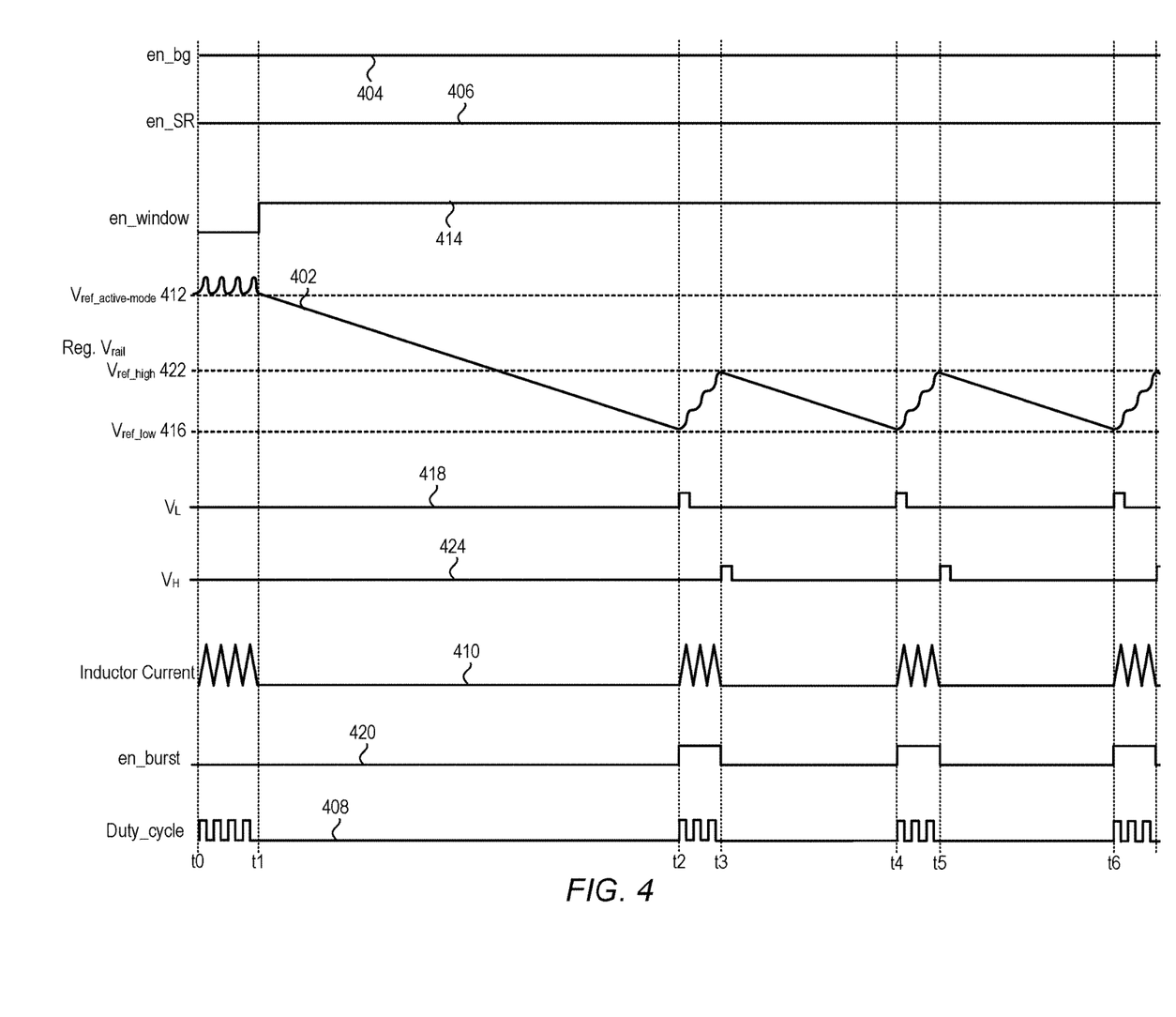
FIG. 4 illustrates timing diagrams for signals in the DC-DC converter of FIGS. 1 and 2, and graphs of various current and voltage generated by the DC-DC converter.

Referring to FIGS. 3 and 4 the method begins at time (10) with the PMU operating in an active-mode, generating and coupling a master reference voltage (Vref_bg) to a DC-DC converter, and operating the DC-DC converter to provide a regulated reference voltage (Vref 402) on the regulated rail coupled to the DC-DC converter (step 302). At this time both a bandgap enable signal (en_bg 404) and an SR enable signal (en_SR 406) are high so that a first switch (S0) is closed or operable to couple Vref_bg to the DC-DC converter, and a second switch (S1) is closed or operable to couple the SR to the Vref_low generator. From time t0 to t1 the master voltage reference generator and all circuits and devices in the DC-DC converter are operating normally, with the window logic circuit providing a duty window or duty cycle signal (duty_cycle 408) to the driver logic circuit, and the driver logic circuit operating to alternately drive the first and second transistors to provide an inductor current 410 varying between a peak detected current (pkdet) and a zero current (zerol). During this time the DC-DC converter is operating active-mode, with a Vref 402 above an active-mode reference voltage (Vref_active-mode 412) on the output capacitor that fluctuates slightly, in synch with the inductor current 410.

At time t1 the PMU enters a sleep-mode, either following a predetermined period of inactivity or a user command, and a window-mode enable signal (en_window 414) is generated and coupled to the DC-DC converter to place it in the window-mode, and, where configured as in FIG. 4, to the master reference generator and the first switch (S0) through which the Vref_bg is coupled to the DC-DC converter (step 304). Initially, the DC-DC converter is place or operated in a coasting-period of the window-mode in which the Vref_bg is decoupled from the DC-DC converter, the SR is decoupled from the Vref_low generator, and operation of the master reference generator and of all circuits and devices in the DC-DC converter except a low-side-comparator is suspended (step 306). As noted above, while in the coasting-period the regulated rail is allowed to discharge through the load or loads coupled thereto, with the inductor and output capacitor providing any necessary Vref to the load(s).

Next, from time t1 to t2 a feedback voltage (Vfb) from the regulated rail is compared to a low reference voltage (Vref_low 416) on the SR using the low-side-comparator, and when at time t2 Vfb is less than or equal to Vref_low, a low voltage signal (VL 418) is output to the window logic circuit (step 308). In response to VL 418, the window logic circuit initiates a burst-period by generating and transmitting an enable burst signal (en_burst 420) to other circuits and devices in the DC-DC converter, and the duty_cycle 408 to the driver logic circuit (step 310). During the burst-period, operation of all circuits and devices in the DC-DC converter, and, where configured as in FIG. 4, the master reference generator are restarted or resumed. The driver logic circuit operates to alternately drive the first and second transistors to provide the inductor current 410 varying between the peak detected current (pkdet) and the zero current (zerol), to charge the inductor and output capacitor to raise the Vref on the regulated rail. Also during the burst-period, the master reference voltage (Vref_bg) is coupled through the first switch to the Vref_low generator in the DC-DC converter, and the SR is coupled through the second switch to the Vref_low generator to charge the SR and restore the voltage to Vref_low.

During the burst-period from time t2 to t3 the feedback voltage (Vfb) from the regulated rail is compared to a high reference voltage (Vref_high 422) from the Vref_high generator using the high-side-comparator, and when Vfb is equal to or greater than Vref_high the high-side-comparator outputs a high voltage signal (VH 424) to the window logic circuit to cease generating and transmitting the en_burst 420 and duty_cycle 408 signals, ending or terminating the burst-period at time t3, and decoupling the SR from the a Vref_low reference generator and decoupling the Vref_low reference generator from the master reference generator, thus beginning or returning to a second coasting-period (step 312).

In the second coasting-period, which is shown in FIG. 4 as extending from time t3 to t4, the first switch (S0) is operated to isolate the master reference generator from the DC-DC converter, the second switch (S1) is operated to decouple the SR from the Vref_low generator, and operation of the master reference generator, where configured as in FIG. 4, and of all circuits and devices in the DC-DC converter except the low-side-comparator are suspended. Following the initiation of the second coasting-period the method continues beginning w step 308 with the comparison of the Vfb to Vref_low on the SR using the low-side-comparator while the regulated rail is allowed to discharge, supplying or providing Vref 402 to the load(s). In the embodiment of FIG. 4 a subsequent burst-period from time t4 to t5 follows the second coasting-period, and is in turn followed by a subsequent coasting-period from time t5 to t6.

The method continues until the PMU 'awakes' terminating the en_window 414 signal and returning the DC-DC converter to the active-mode.

It will be understood that by suspending operation of the master reference generator and all circuits and devices in the DC-DC converter except the low-side-comparator, the coasting-period is extended and the static, quiescent current consumed in the DC-DC converter while the PMU is in a sleep-mode is reduced.

It will further be understood that the combinational logic elements 132, 134 and 206, 208 function such that the en_burst 420 operate the first and second switches (S0 and S1), the Vref_low generator, and the master reference generator only during window-mode.

It is not necessary that the en_window 414 signal be removed (or go low) during burst-periods, nor is it necessary that the en_burst 420 signal be applied during the active-mode to operate the Vref_low generator and the master reference generator, or to close the first and second switches (S0 and S1). Additionally, the low-side comparator 114 output can be extended to duty-cycle or suspend operation of any other always-on (AON) functions in the entire chip during window mode, and thus the method described herein not limited to just circuits in the PMU 100, 200.

Figure 5A:
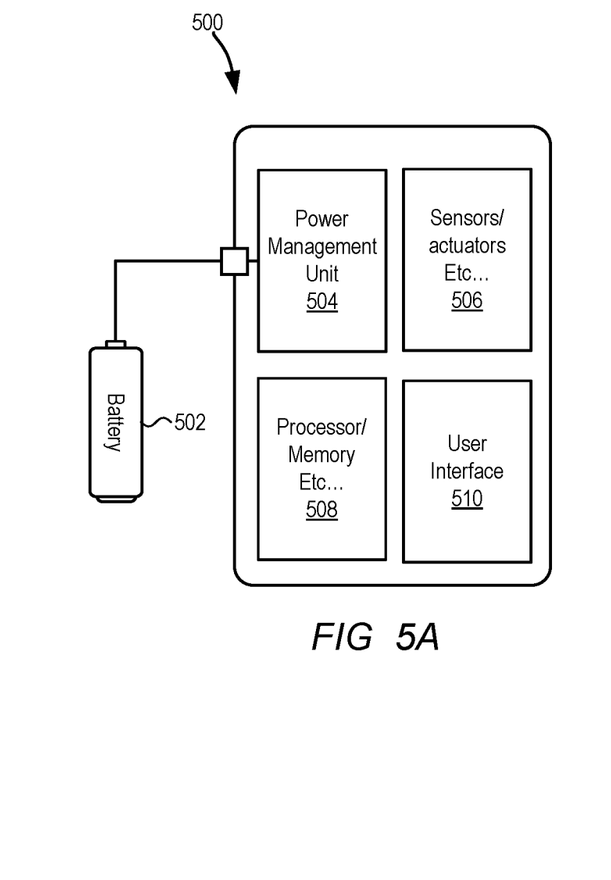
FIG. 5A is a block diagram illustrating a battery powered portable electronic device for which the PMU and method of the present disclosure is particularly useful.

FIG. 5 is a block diagram illustrating a battery powered portable electronic device for which the PMU and method of the present disclosure is particularly useful. The electronic device 500 can include a wireless internet of things (IoT) device, an implantable medical device, or a wearable device. Common types of wearable devices include smart watches, smart glasses and activity trackers. The electronic device 500 generally includes or is coupled to a battery 502 with limited stored energy, and requiring frequent recharging or replacement. Thus, it is desirable that the electronic device 500 include a PMU 504, such as described above, capable of significantly reducing static, quiescent current in a DC-DC converter (not shown in this figure) in sleep-mode to extend battery replacement or recharge intervals.

Referring to FIG. 5A, in addition to the battery 502 and the PMU 504 the electronic device 500 generally includes a number of sensors and or actuators, collectively 506, for detecting and responding to information gathered, a processor and memory 508 for analyzing and recording information gathered, and a user interface 510, such as a transmitter, display or audio alert to provide information or feedback to a user.

Figure 5B:
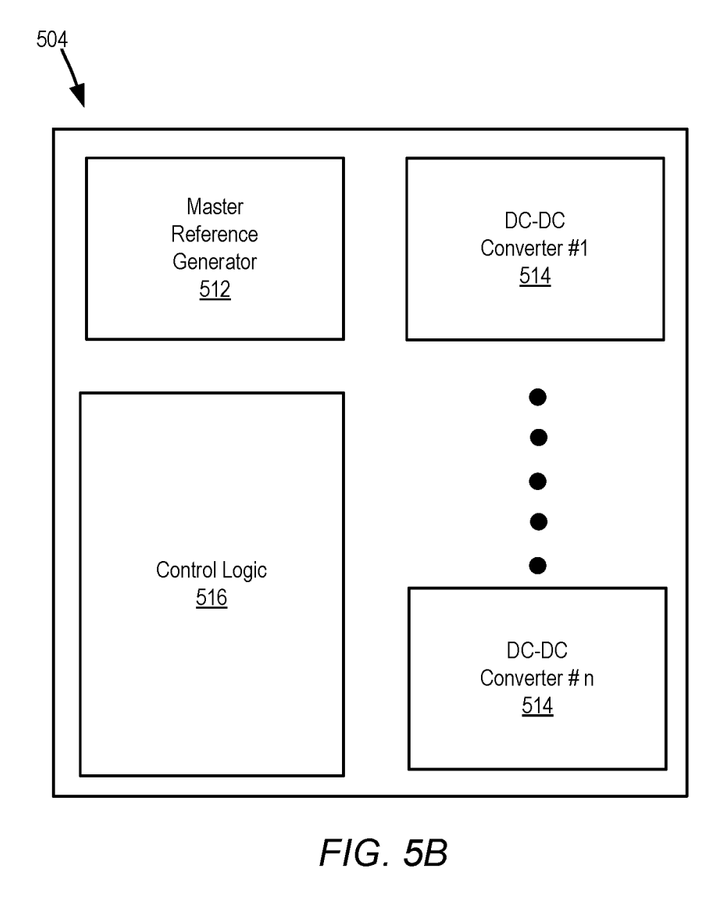
FIG. 5B is a block diagram illustrating details of the PMU of FIG. 5B including a master reference generator and a DC-DC converter according to an embodiment of the present disclosure.

FIG. 5B is a block diagram illustrating details of the PMU 504 of FIG. 5A, and includes a master reference generator 512, one or more DC-DC converters 514 and a controller or control logic 516. As described above, in active-mode the master reference generator 512 generates and provides to the DC-DC converter(s) 514 a master voltage reference (Vref_bg), and the DC-DC converter receives the Vref_bg and provides on a regulated rail a reference voltage (Vref). When the PMU 504 enters a sleep-mode, either following a predetermined period of inactivity in the electronic device 500 or in response to a user command, the control logic 516 generates and couples to the master reference generator 512 and/or the DC-DC converter(s) 514 a window-mode enable signal (en_window) is to place the DC-DC converter in a window-mode exhibiting an ultra-low quiescent current.

Thus, a PMU including a DC-DC converter and methods of operating the same to reduce static, quiescent current during sleep-mode have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A method of operating a DC-DC converter in a window-mode, the method comprising:
   receiving in the DC-DC converter a window-mode enable (en_window) signal, and in a coasting-period:
   opening a switch through which a low reference voltage (Vref_low) generator is coupled to a capacitively-charged switched reference (SR) on a first input of a low-side-comparator;
   suspending operation of all circuits and devices in the DC-DC converter, including the Vref_low generator, except the low-side-comparator;
   comparing the SR to a feedback voltage (Vfb) coupled to a second input of the low-side-comparator from a reference voltage (Vref) on a regulated rail coupled to an output of the DC-DC converter; and
   sensing from the comparing of SR to the Vfb a change in the Vref on the regulated rail as the regulated rail is discharged through a load coupled thereto.

2. The method of claim 1 further comprising when Vref has decreased to the Vref_low stored on the SR, coupling a low voltage signal ($V_L$) from an output of the low-side-comparator to a window logic circuit, generating in the window logic circuit a burst enable (en_burst) signal to at least some of the circuits and devices in the DC-DC converter, including the Vref_low generator, and in a burst-period resuming operation of all of the circuits and devices, and charging an inductor and output capacitor through which the regulated rail is coupled to the output of the DC-DC converter to raise the Vref on the regulated rail from Vref_low to a high reference voltage (Vref_high).

3. The method of claim 2 further comprising closing the switch through which the Vref_low generator is coupled to the SR in response to the en_burst signal coupled thereto, and recharging the SR to Vref_low.

4. The method of claim 3 wherein operating the DC-DC converter during the burst-period further comprises operating the window logic circuit to generate a duty cycle (duty_cycle) signal, coupling the en_burst signal and duty_cycle signal to a driver logic circuit and operating to the driver logic circuit to alternately drive a first transistor through which the output of the DC-DC converter is coupled to a positive voltage (VDD) and a second transistor through which the output is coupled to a negative voltage (VSS) to charge the inductor and output capacitor to raise the Vref from Vref_low to Vref_high.

5. The method of claim 3 wherein the circuits and devices in the DC-DC converter include a high-side-comparator comprising a first input coupled to receive Vfb from the regulated rail, a second input coupled to a Vref_high generator, and a high-side-comparator output coupled to the window logic circuit, and wherein operating the DC-DC converter in the burst-period further comprises comparing Vfb to the Vref_high, and when Vfb is equal to or greater than Vref_high outputting a high voltage signal (VH) to the window logic circuit to terminate the en_burst signal, suspending operation of all circuits and devices in the DC-DC converter, except the low-side-comparator, opening the switch through which the Vref_low generator is coupled to the SR, and returning to the coasting-period.

6. The method of claim 3 wherein operating the DC-DC converter in window-mode further comprises receiving an SR enable (en_SR) signal, and wherein the en_SR signal, the en_window signal and the en_burst signal are coupled to the switch through a first combinational logic element, the first combinational logic element operable to open the switch when only the en_SR signal and the en_window signal are present, and to close the switch when the en_SR signal, the en_window signal and the en_burst signal are all present.

7. The method of claim 6 wherein the en_SR signal, the en_window signal and the en_burst signal are coupled to the Vref_low generator through a second combinational logic element, the second combinational logic element operable to suspend operation of the Vref_low generator when only the en_SR signal and the en_window signal are present, and to resume operation of the Vref_low generator when the en_SR signal, the en_window signal and the en_burst signal are all present.

8. A method of operating a power management unit (PMU) in a window mode, the method comprising:
   receiving in a DC-DC converter and a master reference generator in the PMU a window-mode enable (en_window) signal, and in a coasting-period:
   opening a first switch (S0) through which a master reference generator is coupled to a capacitively-charged band-gap reference (BG) coupled to a low reference voltage (Vref_low) generator in the DC-DC converter;
   in the DC-DC converter, opening a second switch (S1) through which the Vref_low generator is coupled to a capacitively-charged switched reference (SR) on a first input of a low-side-comparator;
   suspending operation of the master reference generator and all circuits and devices in the DC-DC converter, including the Vref_low generator, except the low-side-comparator;
   comparing the Vref_low stored on the SR to a feedback voltage (Vfb) coupled to a second input of the low-side-comparator from a reference voltage (Vref) on a regulated rail coupled to an output of the DC-DC converter; and
   sensing from the comparing of SR to the Vfb a change in the Vref on the regulated rail as the regulated rail is discharged through a load coupled thereto.

9. The method of claim 8 further comprising when Vref has decreased to the Vref_low stored on the SR, coupling a low voltage signal ($V_L$) from an output of the low-side-comparator to a window logic circuit, generating in the window logic circuit a burst enable (en_burst) signal to the master reference generator and at least some of the circuits and devices in the DC-DC converter, including the Vref_low generator, and in a burst-period resuming operation of the master reference generator and all of the circuits and devices, and charging an inductor and output capacitor through which the regulated rail is coupled to the output of the DC-DC converter to raise the Vref on the regulated rail from Vref_low to a high reference voltage (Vref_high).

10. The method of claim 9 further comprising in response to the en_burst signal closing switches S0 and S1 recharging the BG to a master reference voltage (Vref_bg) and recharging the SR to Vref_low.

11. The method of claim 10 wherein operating the DC-DC converter during the burst-period further comprises operating the window logic circuit to generate a duty cycle signal (duty_cycle), coupling the en_burst signal and duty_cycle signal to a driver logic circuit and operating to the driver logic circuit to alternately drive a first transistor through which the output of the DC-DC converter is coupled to a positive voltage (VDD) and a second transistor through which the output is coupled to a negative voltage (VSS) to charge the inductor and output capacitor to raise the Vref from Vref_low to Vref_high.

12. The method of claim 10 wherein the circuits and devices in the DC-DC converter include a high-side-comparator comprising a first input coupled to receive Vfb from the regulated rail, a second input coupled to a Vref_high generator, and a high-side-comparator output coupled to the window logic circuit, and wherein operating the DC-DC converter in the burst-period further comprises comparing Vfb to the Vref_high, and when Vfb is equal to or greater than Vref_high outputting a high voltage signal (VH) to the window logic circuit to terminate the en_burst signal, suspending operation of all circuits and devices in the DC-DC converter, except the low-side-comparator, opening switches S0 and S1, and returning to the coasting-period.

13. The method of claim 12 wherein operating the DC-DC converter in window-mode further comprises receiving an SR enable (en_SR) signal, and wherein the en_SR signal, the en_window signal and the en_burst signal are coupled to S0 through a first combinational logic element and to S1 through a second combinational logic element, the first combinational logic element operable to open S0 when only the en_SR signal and the en_window signal are present, and to close S0 when the en_SR signal, the en_window signal and the en_burst signal are all present, and the second combinational logic element operable to open S1 when only the en_SR signal and the en_window signal are present, and to close S1 when the en_SR signal, the en_window signal and the en_burst signal are all present.

14. The method of claim 13 wherein the en_SR signal, the en_window signal and the en_burst signal are coupled to the master reference generator through a third combinational logic element and to the Vref_low generator through a fourth combinational logic element, and wherein the third combinational logic element is operable to suspend operation of the master reference generator when only the en_SR signal and the en_window signal are present, and to resume operation of the master reference generator when the en_SR signal, the en_window signal and the en_burst signal are all present, and the third combinational logic element is operable to suspend operation of the Vref_low generator when only the en_SR signal and the en_window signal are present, and to resume operation of the Vref_low generator when the en_SR signal, the en_window signal and the en_burst signal are all present.

15. A power management unit (PMU) comprising:
   a DC-DC converter operable to provide a reference voltage (Vref) on a regulated rail coupled to an output of the DC-DC converter, the DC-DC converter including:
      a low reference voltage (Vref_low) generator operable to generate a low reference voltage (Vref_low);
      a capacitively-charged switched reference (SR) coupled through a first switch (S1) to the Vref_low generator and operable to receive and store the Vref_low; and
      a low-side-comparator having a first input coupled to the SR and a second input coupled to receive a feedback voltage (Vfb) from the Vref on the regulated rail,
   wherein the DC-DC converter is operable to receive a window-mode enable (en_window) signal, and in a coasting-period to: open the first switch; suspend operation of all circuits and devices in the DC-DC converter, except the low-side-comparator; and compare the Vref_low stored on the SR to the Vfb to sense a change in the Vref on the regulated rail as the regulated rail is discharged through a load coupled thereto.

16. The PMU of claim 15 wherein the low-side-comparator is operable to output a low voltage signal ($V_L$) when Vref has decreased to the Vref_low stored on the SR, and further comprising a window logic circuit coupled to an output of the low-side-comparator, the window logic circuit operable to generate a burst enable (en_burst) signal to at least some of the circuits and devices in the DC-DC converter, initiating a burst-period, causing the first switch (S1) to close recharging the SR to Vref_low, and all of the circuits and devices to resume operation to charge an inductor and output capacitor through which the regulated rail is coupled to the output of the DC-DC converter to raise the Vref on the regulated rail from Vref_low to a high reference voltage (Vref_high).

17. The PMU of claim 16 wherein the window logic circuit is further operable in the burst-period to generate a duty cycle (duty_cycle) signal, and further comprising a driver logic circuit coupled to the window logic circuit, the driver logic circuit operable to receive the en_burst signal and duty_cycle signal and to alternately drive a first transistor through which the output of the DC-DC converter is coupled to a positive voltage (VDD) and a second transistor through which the output is coupled to a negative voltage (VSS) to charge the inductor and output capacitor to raise the Vref from Vref_low to Vref_high.

18. The PMU of claim 16 wherein the circuits and devices in the DC-DC converter include a high-side-comparator comprising a first input coupled to receive Vfb from the regulated rail, a second input coupled to a high reference voltage (Vref_high) generator to receive a high reference voltage (Vref_high) therefrom, and a high-side-comparator output coupled to the window logic circuit, and wherein the high-side-comparator is operable in the burst-period to compare Vfb to Vref_high, and when Vfb is equal to or greater than Vref_high to output a high voltage signal (VH) to the window logic circuit to terminate the en_burst signal, suspending operation of all circuits and devices in the DC-DC converter, except the low-side-comparator, and opening the first switch (S1), returning to the coasting-period.

19. The PMU of claim 16 wherein the DC-DC converter is further operable to receive an SR enable (en_SR) signal in window-mode, and wherein the DC-DC converter further comprises a first combinational logic element through which the en_SR signal, the en_window signal and the en_burst signal are coupled to the first switch (S1), the first combinational logic element operable to open the first switch (S1) in window mode when only the en_SR signal and the en_window signal are present, and to close the first switch (S1) when the en_SR signal, the en_window signal and the en_burst signal are all present.

20. The PMU of claim 19 wherein the DC-DC converter further comprises a second combinational logic element through which the en_SR signal, the en_window signal and the en_burst signal are coupled to the the Vref_low generator, the second combinational logic element operable to suspend operation of the Vref_low generator in window mode when only the en_SR signal and the en_window signal are present, and to resume operation of the Vref_low generator when the en_SR signal, the en_window signal and the en_burst signal are all present.

21. The PMU of claim 20 further comprising a master reference generator coupled through a second switch (S0) coupled to a capacitively-charged band-gap reference (BG), the BG coupled to the Vref_low generator in the DC-DC converter, and wherein the PMU further comprises a third combinational logic element through which the en_SR signal, the en_window signal and the en_burst signal are coupled to the second switch (S0), the third combinational logic element operable to open the second switch (S0) in window mode when only the en_SR signal and the en_window signal are present, and to close the second switch (S0) when the en_SR signal, the en_window signal and the en_burst signal are all present.

22. The PMU of claim 21 wherein the PMU further comprises a fourth combinational logic element through which the en_SR signal, the en_window signal and the en_burst signal are coupled to the master reference generator, and wherein the fourth combinational logic element is operable to suspend operation of the master reference generator in window mode when only the en_SR signal and the en_window signal are present, and to resume operation of the master reference generator when the en_SR signal, the en_window signal and the en_burst signal are all present.

* * * * *